United States Patent
Ito

(10) Patent No.: US 11,037,112 B2
(45) Date of Patent: Jun. 15, 2021

(54) INFORMATION PROCESSING APPARATUS AND INFORMATION PROCESSING METHOD

(71) Applicant: Sony Corporation, Tokyo (JP)

(72) Inventor: Takayuki Ito, Tokyo (JP)

(73) Assignee: Sony Corporation, Tokyo (JP)

(*) Notice: Subject to any disclaimer, the term of this patent is extended or adjusted under 35 U.S.C. 154(b) by 554 days.

(21) Appl. No.: 15/092,038

(22) Filed: Apr. 6, 2016

(65) Prior Publication Data

US 2016/0217441 A1  Jul. 28, 2016

Related U.S. Application Data

(63) Continuation of application No. 12/519,080, filed as application No. PCT/JP2007/070877 on Oct. 26, 2007, now Pat. No. 9,355,397.

(30) Foreign Application Priority Data

Dec. 13, 2006 (JP) .............................. JP2006-336291

(51) Int. Cl.
*G06Q 20/34* (2012.01)
*G06Q 20/20* (2012.01)
(Continued)

(52) U.S. Cl.
CPC ......... *G06Q 20/105* (2013.01); *G06Q 20/202* (2013.01); *G06Q 20/26* (2013.01);
(Continued)

(58) Field of Classification Search
CPC .... G06Q 20/341; G06Q 20/382; G06Q 20/06; G06Q 20/32; G06Q 20/0658;
(Continued)

(56) References Cited

U.S. PATENT DOCUMENTS 5,724,417 A * 3/1998 Bartholomew ........ H04Q 3/627
    235/380
6,211,799 B1 * 4/2001 Post ..................... A61B 5/0028
    341/33
(Continued)

FOREIGN PATENT DOCUMENTS

EP    1603062    12/2005
JP    11-104344   4/1999
(Continued)

OTHER PUBLICATIONS

International Search Report dated Nov. 27, 2007, for corresponding Patent Application PCT/JP2007/070877.

*Primary Examiner* — Ariel J Yu
*Assistant Examiner* — Dana Amsdell
(74) *Attorney, Agent, or Firm* — K&L Gates LLP

(57) ABSTRACT

An information processing apparatus is provided. The information processing apparatus includes a communication unit configured to: transmit a first update command for updating a value stored in a terminal device to the terminal device, transmit a second update command when no notification is received after the first update command transmitted within a first predetermined time; a control unit configured to determine if the value has been changed by comparing a first value retrieved from the terminal device before the first update command transmitted and a second value retrieved from the terminal device after the second update command transmitted when no notification is received after the second update command transmitted within a second predetermined time. An information processing method is also provided.

6 Claims, 13 Drawing Sheets

| ELECTRONIC MONEY FUNCTION UNIT ID | TRANSACTION AMOUNT | DATE, HOURS, MINUTES, AND SECONDS OF TRANSACTION | AFFILIATED STORE ID | . . . | TRANSACTION VALIDITY FLAG |
|---|---|---|---|---|---|
| 0123456 | SETTLEMENT ¥ 300 | 2009/11/29/... | . . . | . . . | VALID |
| 9876543 | CHARGE ¥ 100 | 2009/11/29/... | . . . | . . . | INVALID |
| 8523698 | SETTLEMENT ¥ 200 | 2009/11/29/... | . . . | . . . | EXCEPTION |
| . . . | . . . | . . . | . . . | . . . | . . . |

(51) Int. Cl.
*G06Q 20/10* (2012.01)
*G06Q 40/00* (2012.01)
*G06Q 20/26* (2012.01)
*G06Q 20/42* (2012.01)
*G07F 7/10* (2006.01)

(52) U.S. Cl.
CPC ......... *G06Q 20/341* (2013.01); *G06Q 20/352* (2013.01); *G06Q 20/42* (2013.01); *G06Q 40/12* (2013.12)

(58) Field of Classification Search
CPC ............. G06Q 20/3229; G06Q 20/363; G06Q 20/389; G06Q 20/425; G06Q 20/327; G06Q 20/3278; G07F 7/084; H04L 2463/102; H04W 24/00; H04W 24/08
See application file for complete search history.

(56) References Cited

U.S. PATENT DOCUMENTS

| | | | | |
|---|---|---|---|---|
| 6,336,031 | B1* | 1/2002 | Schyndel | H04B 13/00 340/870.37 |
| 6,424,820 | B1* | 7/2002 | Burdick | H04B 5/0081 455/132 |
| 7,107,247 | B2* | 9/2006 | Kinoshita | G06Q 20/06 705/64 |
| 7,996,189 | B2* | 8/2011 | Kaplan | H04M 1/72454 702/189 |
| 8,538,801 | B2* | 9/2013 | Giordano | G06Q 20/322 705/13 |
| 2001/0029488 | A1* | 10/2001 | Takeshima | G06Q 20/341 705/41 |
| 2002/0116344 | A1* | 8/2002 | Kinoshita | G06Q 20/363 705/65 |
| 2003/0011684 | A1* | 1/2003 | Narayanaswami | G06T 1/0021 348/207.99 |
| 2003/0036914 | A1* | 2/2003 | Fitzpatrick | G06Q 30/02 705/319 |
| 2003/0125026 | A1* | 7/2003 | Tsunehara | H04W 64/00 455/435.1 |
| 2005/0222961 | A1* | 10/2005 | Staib | G06Q 20/327 705/64 |
| 2006/0009160 | A1* | 1/2006 | Craig | H04W 24/00 455/67.11 |
| 2006/0022800 | A1* | 2/2006 | Krishna | G06K 17/0029 340/10.2 |
| 2006/0052055 | A1* | 3/2006 | Rowse | G06K 7/0008 455/41.1 |
| 2006/0133543 | A1* | 6/2006 | Linsky | H04B 17/336 375/341 |
| 2006/0215611 | A1* | 9/2006 | Nakagawa | H04W 72/044 370/332 |
| 2007/0293202 | A1* | 12/2007 | Moshir | G06F 21/552 455/414.2 |
| 2009/0004969 | A1* | 1/2009 | Luong | H04W 84/18 455/41.1 |

FOREIGN PATENT DOCUMENTS

| | | |
|---|---|---|
| JP | 2000-250994 | 9/2000 |
| JP | 2001-067529 | 3/2001 |
| JP | 2001-256564 | 9/2001 |
| JP | 2001-344537 | 12/2001 |
| JP | 2002-367016 | 12/2002 |
| JP | 2004-062240 | 2/2004 |
| JP | 2004-272560 | 9/2004 |
| JP | 2005-018508 | 1/2005 |

* cited by examiner

| ELECTRONIC MONEY FUNCTION UNIT ID | TRANSACTION AMOUNT | DATE, HOURS, MINUTES, AND SECONDS OF TRANSACTION | AFFILIATED STORE ID | ... | TRANSACTION VALIDITY FLAG |
|---|---|---|---|---|---|
| 0123456 | SETTLEMENT ¥300 | 2009/11/29/... | ... | ... | VALID |
| 9876543 | CHARGE ¥100 | 2009/11/29/... | ... | ... | INVALID |
| 8523698 | SETTLEMENT ¥200 | 2009/11/29/... | ... | ... | EXCEPTION |
| ... | ... | ... | ... | ... | ... |

FIG. 7 ately once a day, for example.

INFORMATION PROCESSING APPARATUS AND INFORMATION PROCESSING METHOD

CROSS REFERENCE TO RELATED APPLICATIONS

The present application is a continuation of U.S. application Ser. No. 12/519,080, filed Jun. 12, 2009, which is a National Stage of International Application No. PCT/JP2007/070877 filed on Oct. 26, 2007 and which claims priority to Japanese Patent Application No. 2006-336291 filed on Dec. 13, 2006, the entire contents of which are being incorporated herein by reference.

BACKGROUND

The present disclosure relates to an electronic money system, a money amount change information transmission apparatus, a server, and a money amount change information transmission method, and relates to those that transmit money amount change information required to change a balance to, e.g., an electronic money card.

With recent popularization of electronic money, business transactions using electronic money have been actively conducted.

The business transactions using the electronic money are conducted by operating electronic data called "value" having an exchange value equivalent to money to transfer values.

A balance of the value is written in a built-in IC chip in, e.g., an electronic money card, and settlement can be performed by accessing the IC chip from an electronic money terminal installed in, e.g., a store to reduce the balance.

Further, an amount of the value stored in the IC chip can be increased by accessing the electronic money card from the electronic money terminal. Processing of increasing an amount is called "charge".

When performing charge, collecting money corresponding to an amount that is charged from a user of the electronic money card enables achieving association between the value and a currency.

The electronic money terminal stores utilization log data recording settlement with respect to the electronic money card or processing contents of charge, and transmits this data to an electronic money server by batch processing approximately once a day, for example.

The electronic money server collects/stores the utilization log data from each electronic money terminal, and tallies such data once a month, for example. Furthermore, an operation company of the electronic money distributes a money amount collected from a user at the time of charge to each affiliated store (a store that performs settlement based on the value) to settle accounts for funds in accordance with a result of this tally.

As a technology that uses the value stored in the electronic money card to perform settlement in this manner, there is, e.g., the following service provision method.

Patent Document 1: Japanese Patent Application Laid-open No. 2000-250994

According to this technology, a value previously stored in an IC card is used to pay for a service.

The electronic money terminal transmits money amount change information (a command) to the electronic money card to increase/decrease the value balance but, when the electronic money card does not make a response that the money amount change processing has been executed after transmission of the money amount change information, since whether the balance has been changed in the electronic money card is not unclear on the electronic money terminal side, any countermeasure must be taken.

Such a situation may be possibly uncommonly occurring when a use environment has a problem, e.g., when radio frequencies of other devices are also present.

SUMMARY

It is, therefore, an object to confirm whether a currency terminal has executed money amount change processing when no response is made after transmission of money amount change information to the currency terminal (an IC chip).

To achieve this object, the present application according an embodiment provides an electronic money system including a currency terminal, an electronic money terminal, a head office server, and an electronic money server, wherein the currency terminal stores a money amount of a monetary value as electronic data and changes the stored money amount of the monetary value by using money amount change information, the electronic money terminal includes an electronic money module and a POS unit, the electronic money module transmits the money amount change information to the currency terminal, generates log data including a money amount concerning the money amount change information and whether notification indicating that the money amount has been changed is received from the currency terminal, and transmits it to the electronic money server, and the POS unit compares balances before and after transmission of the money amount change information in the currency terminal to judge whether the currency terminal has changed the money amount when the electronic money module does not receive the notification, generates confirmation log data that includes a result of the judgment and is associated with the log data, and transmits it to the head office server, the head office server receives the confirmation log data from the POS unit, aggregates the plurality of pieces of received confirmation log data as one piece of confirmation log data, and transmits it to the electronic money server, and the electronic money server receives the log data from the electronic money module, receives the confirmation log data from the head office server, retrieves one associated with the log data from the received confirmation log data when the received log data indicates that notification that the money amount has been changed is not received from the currency terminal, and confirms whether the currency terminal has changed the money amount in processing concerning the log data based on a result of judgment recorded in the retrieved confirmation log data.

According to an embodiment, a money amount change information transmission apparatus is provided that stores a money amount of a monetary value as electronic data and transmits money amount change information to a currency terminal that changes the stored money amount of the monetary value by using the received money amount change information, comprising: money amount change information generating means for acquiring a money amount concerning a change to generate the money amount change information; first balance acquiring means for acquiring a balance before transmission of the money amount change information from the currency terminal; money amount change information transmitting means for transmitting the generated money amount change information to the currency terminal; notification receiving means for receiving notification indicating that the money amount has been changed based on the transmitted money amount change information from the currency terminal; and second balance acquiring means for acquiring a current balance from the currency terminal when the notification is not received.

According to an embodiment, the money amount change information transmission apparatus is provided, comprising: comparing means for comparing a balance acquired by the first balance acquiring means with a balance acquired by the second balance acquiring means; and judging means for judging whether the money amount has been changed by the currency terminal based on the money amount change information from a result of the comparison performed by the comparing means.

In an embodiment, the money change information transmission apparatus is provided wherein, when the judging means determines that the money amount has not been changed, the money amount change information transmitting means again transmits the money amount change information to the currency terminal.

In an embodiment, the money amount change information transmission apparatus is provided comprising: log data generating means for generating log data having contents of processing with respect to the currency terminal recorded therein; and log data transmitting means for transmitting the generated log data to a predetermined server apparatus, wherein, when the judging means performs the judgment, the log data generating means records a result of the judgment in the log data.

In an embodiment, the money amount change information transmission apparatus is provided comprising: first log data transmitting means for generating log data having a money amount concerning the money amount change information and whether notification indicating that the money amount has been changed is received from the currency terminal recorded therein and transmitting it to a predetermined log server; and second log data transmitting means for generating confirmation log data that is associated with the generated log data and has a judgment result obtained when the judging means makes the judgment recorded therein and transmitting it to a predetermined server.

In an embodiment, the money amount change information transmission apparatus is provided, wherein the predetermined server to which the confirmation log data is transmitted from the second log data transmitting means is an aggregation server that aggregates the plurality of pieces of confirmation log data as one piece of confirmation log data and transmits it to the predetermined server as a transmission destination of the first log data transmitting means.

In an embodiment, a server is provided comprising: first log data receiving means for receiving log data generated by the money amount change information transmission apparatus according to the embodiment described above; second log data receiving means for receiving confirmation log data generated by the money amount change information transmission apparatus; retrieving means for retrieving confirmation log data associated with the received log data from the received confirmation log data when the received log data indicates that notification that a money amount has been changed is not received from the currency terminal; and confirming means for confirming whether the currency terminal has changed the money amount in processing concerning the log data based on a judgment result recorded in the retrieved confirmation log data.

In an embodiment, a money amount change information transmission method is provided and performed by a money amount change information transmission apparatus that stores a money amount of a monetary value as electronic data and transmits money amount change information to a currency terminal that changes the stored money amount of the monetary value by using the received money amount change information, the money amount change information transmission apparatus comprising: money amount change information generating means; first balance acquiring means; money amount change information transmitting means; notification receiving means; and second balance acquiring means, the method comprising: a money amount change information generation step of using the money amount change information generating means to acquire a money amount concerning a change and generate the money amount change information; a first balance acquisition step of using the first balance acquiring means to acquire a balance before transmission of the money amount change information from the currency terminal; a money amount change information transmission step of using the money amount change information transmitting means to transmit the generated money amount change information to the currency terminal; a notification reception step of using the notification receiving means to receive notification indicating that the money amount has been changed based on the transmitted money amount change information from the currency terminal; and a second balance acquisition step of using the second balance acquiring means to acquire a current balance from the currency terminal when the notification is not received.

According to the present application, acquiring a balance before transmission of money amount change information and a balance after the transmission enables confirming whether the currency terminal has executed the money amount change processing when no response is made after the transmission of the money amount change information to the currency terminal.

Additional features and advantages are described herein, and will be apparent from, the following Detailed Description and the figures.

BRIEF DESCRIPTION OF THE FIGURES

FIG. 7 is a view for explaining a logical configuration of utilization log data;

DETAILED DESCRIPTION (1) Outline of Embodiment

Figure 1:
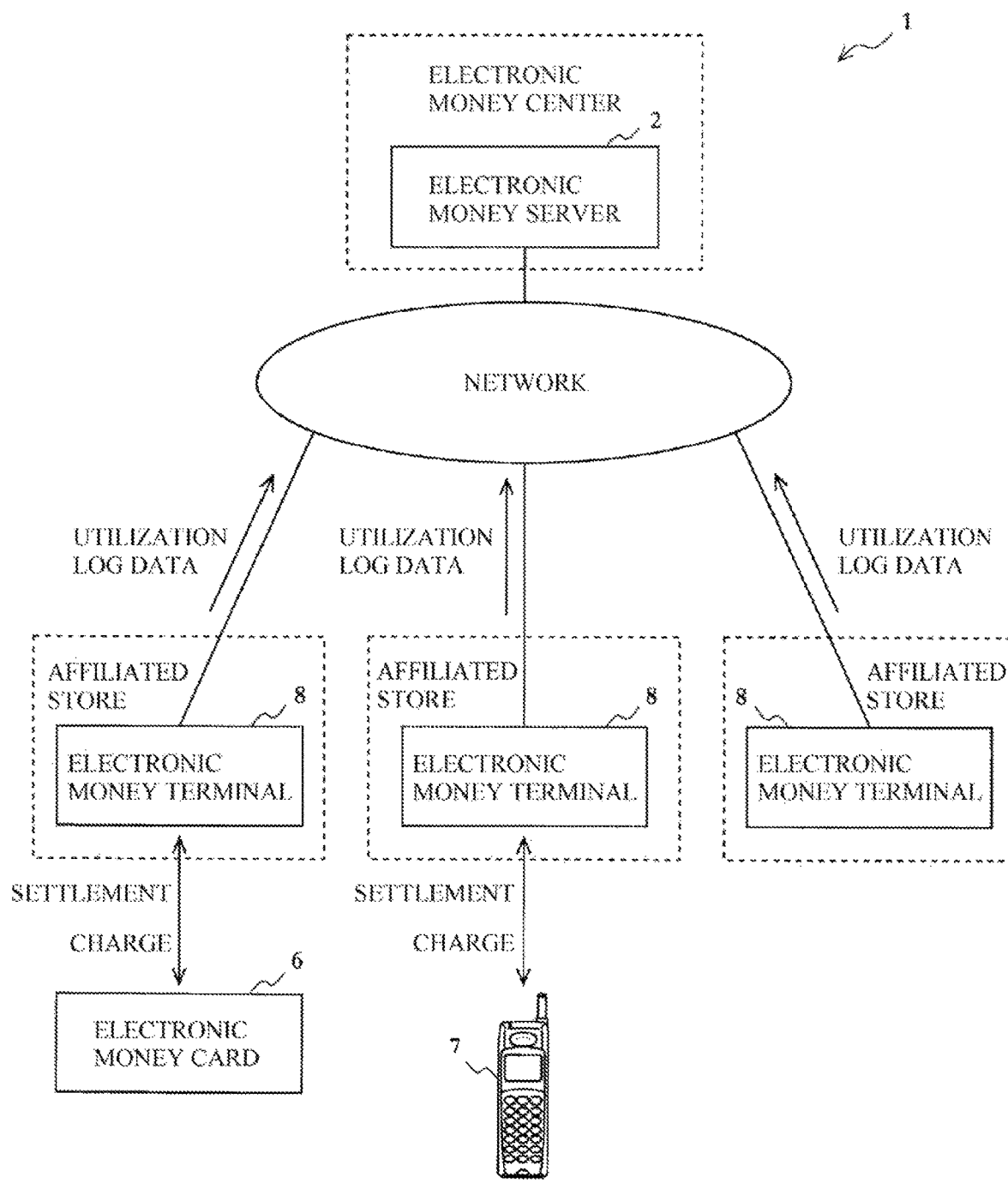
FIG. 1 is a view for explaining a network configuration of an electronic money system.

An electronic money terminal 8 (FIG. 1) establishes a near-field wireless line with an electronic money card 6, and reads a value balance at the present moment (i.e., before transmission of money amount change information) from the electronic money card 6 to be stored therein. Then, the electronic money terminal 8 transmits the money amount change information to the electronic money card 6.

The electronic money card 6 receives the money amount change information from the electronic money terminal 8, increases or decreases the value balance based on this information, and makes a response indicating that the money amount change information has been carried out to the electronic money terminal 8.

The electronic money terminal 8 waits for a response from the electronic money card 6 for a predetermined time and, if a response is transmitted, the electronic money terminal 8 recognizes that the value balance has been updated by the electronic money card 6 and generates utilization log data indicating that processing has succeeded.

If no response is transmitted even though the electronic money terminal 8 waits for the predetermined time, it again transmits the money amount change information to perform a retry. If a response is received from the electronic money card 6 based on the retry, the electronic money terminal 8 recognizes that the value balance has been updated in the electronic money card 6 and generates utilization log data indicating that processing has succeeded.

If there is no response with respect to the retry, the electronic money terminal 8 forcibly reads a current value balance (i.e., the value balance after transmission of the money amount change information) of the electronic money card 6.

The electronic money terminal 8 compares this value balance with the value balance read before transmission of the money amount change information and, if a magnitude relation of the value balances is correct (i.e., the balance before transmission of the money amount change information>the current balance in case of settlement, and this relation is reversed in case of charge), the electronic money terminal 8 recognizes the value balance has been updated in the electronic money card 6 and generates utilization log data indicating that processing has succeeded.

On the other hand, if both the value balances are equal to each other, the electronic money terminal 8 determines that the money amount change information has not been carried out in the electronic money card 6 and generates utilization log data indicating that processing has failed.

The utilization log data generated by the electronic money terminal 8 in this manner is subjected to tallying processing by an electronic money serer 2.

The electronic money server 2 determines the utilization log data indicative of successful execution of the money amount change processing in the electronic money card 6 as a fund settlement target and the utilization log data indicative of unsuccessful execution of the same as a non-target for fund settlement.

As explained above, even if there is no response from the electronic money card 6 after transmitting the money amount change information to the electronic money card 6, the electronic money terminal 8 compares the value balances before and after transmission of the money amount change information, thereby confirming whether the electronic money card 6 has carried out the money amount change information.

(2) Details of Embodiment

FIG. 1 is a view showing a network configuration of an electronic money system 1.

The electronic money system 1 includes an electronic money card 6, a mobile phone 7, an electronic money server 2, an electronic money terminal 8, and others, and the electronic money terminal 8 can be connected with the electronic money server 2 through a network.

The electronic money card 6 has a built-in non-contact type IC chip and can be connected with the electronic money terminal 8 based on near-field wireless communication. Specifically, the electronic money card 6 is placed on or held up above a later-explained reader/writer unit of the electronic money terminal 8.

It is to be noted that the IC chip may be of a contact type so that it can be connected with the electronic money terminal 8 based on contact of an electrode.

An electronic money function is incorporated in this IC chip, and the electronic money card 6 can use this function to receive the money amount change information from the electronic money terminal 8 and increase (in case of charge) or decrease (in case of settlement) an amount of a stored value.

Here, the value means electronic data associated with a monetary value in the electronic money system 1, and it has a money amount as an attribute and causes shift of an exchange value equal to a currency based on an increase/decrease in this money amount.

It is to be noted that a concept of the value is not restricted to a currency, and an exchange value such as a point that can be exchanged with commodities or services can be included in this concept.

At the time of charge, a currency having a money amount associated with a value is collected in the form of cash or credit from a user, and it is distributed to each affiliated store that has made settlement by using the value in accordance with a settlement amount, thereby associating the value and the currency with each other.

As explained above, the built-in IC chip in the electronic money card 6 is a terminal which communicates with, e.g., the electronic money terminal 8, and functions as a currency terminal which stores a money amount of a monetary value as electronic data and uses received money amount change information to change the stored money amount of the monetary value.

The mobile phone 7 is a mobile terminal having the same built-in IC chip as that in the electronic money card 6 and has a function as an electronic money card.

The mobile phone 7 can perform near-field wireless communication with the electronic money terminal 8 like the electronic money card 6 to receive money amount change information for execution of charge or settlement, and can also receive money amount change information from the electronic money server 2 through a network, e.g., the Internet to carry out charge or settlement.

It is to be noted that an IC chip can be mounted in a portable terminal such as a PDA (Personal Digital Assistant) besides the mobile phone 7 and this terminal can be used like the electronic money card 6.

Although an example using the electronic money card 6 will be explained hereinafter, the same explanation can be achieved with respect to the mobile phone 7 and others.

Affiliated stores are stores where settlement or charge using values can be effected through the electronic money card 6 or the mobile phone 7 (convenience stores, department stores, restaurants, automatic vending machines, other retail stores, moving stalls, other movable bodies, and others), and one or more electronic money terminals 8 are provided at accounting positions.

The electronic money terminal 8 is a terminal that accesses the IC chip of the electronic money card 6 based on near-field wireless communication, and it is solely installed or incorporated and installed in an accounting device or the like (a cash register), for example.

Alternatively, as other installation conformations, a charge dedicated electronic money terminal 8 may be installed in an open space of a commercial facility, or a settlement dedicated electronic money terminal 8 may be incorporated in an automatic vending machine to be utilized for settlement in the automatic vending machine.

The electronic money terminal 8 can access the electronic money card 6 to transmit money amount change information for execution of charge or settlement. In this manner, the electronic money terminal 8 functions as a money amount change information transmission apparatus that transmits money amount change information to the currency terminal (the IC chip).

When the money amount change information is transmitted to the electronic money card 6 to increase or decrease a value balance, the electronic money terminal 8 generates utilization log data having processing contents with respect to the electronic money card 6 recorded therein.

The electronic money terminal 8 stores the generated utilization log data and transmits it to the electronic money server 2 in batch processing approximately once a day, for example.

When the money amount change information is transmitted to the electronic money card 6, the electronic money terminal 8 receives a response transmitted from the electronic money card 6 to thereby confirm that the money amount change information has been carried out in the electronic money card 6 but, if no response is transmitted from the electronic money card 6, the electronic money terminal 8 reads a current value balance of the electronic money card 6.

It is to be noted that, when confirming a value balance in this manner, the electronic money terminal 8 can be configured to inform a person in charge that the balance is confirmed based on, e.g., display or sound.

It can be considered that, when the money amount change processing has not succeeded, a customer may think that the money amount change processing has succeeded and move the electronic money card 6 away from a reader/writer unit 39 or may think that a device failure has occurred and again hold up the electronic money card 6 above the reader/writer unit 39, and hence the person in charge can give the customer an explanation or an instruction to install the electronic money card 6 in the reader/writer unit 39 by configuring the electronic money terminal 8 to inform the person in charge in this manner.

The electronic money terminal 8 previously reads and stores a value balance before processing of the electronic money card 6 prior to transmission of the money amount change information, compares the current value balance with the value balance before processing to confirm whether the money amount change information has been carried out in the electronic money card 6, and records a result of this confirmation in the utilization log data as a transaction validity flag.

The transaction validity flag is set to "valid" when the money amount change information has been carried out, and the transaction validity flag is set to "invalid" when the same is not carried out.

An electronic money center is a business enterprise operating the electronic money system 1 and manages the electronic money system 1 by using the electronic money server 2 and others.

The electronic money server 2 is connected with the electronic money terminals 8, 8, 8, . . . through the network, receives utilization log data from each electronic money terminal 8, and stores such data to perform tallying processing in accordance with each affiliated stores.

The electronic money server 2 executes this tallying processing by using utilization log data having a transaction validity flag set to "valid", and totalizes charged amounts and also totalizes amounts settled as values in accordance with each affiliated store. On the other hand, utilization log data having a transaction validity flag set to "invalid" is determined as a non-target of fund settlement by the electronic money server 2.

The money amount charged by each affiliated store is subjected to fund settlement in the electronic money center from the affiliated store, and the settled money amount is subjected to fund settlement in the affiliated store from the electronic money center.

As explained above, the electronic money server 2 determines the utilization log data having the transaction validity flag set to "valid" as a target of fund settlement since an amount of a value balance has been changed in the electronic money card 6, but it does not determine the utilization log data having the transaction validity flag set to "invalid" as a target of fund settlement since an amount of a value balance is not changed in the electronic money card 6.

Figure 2:
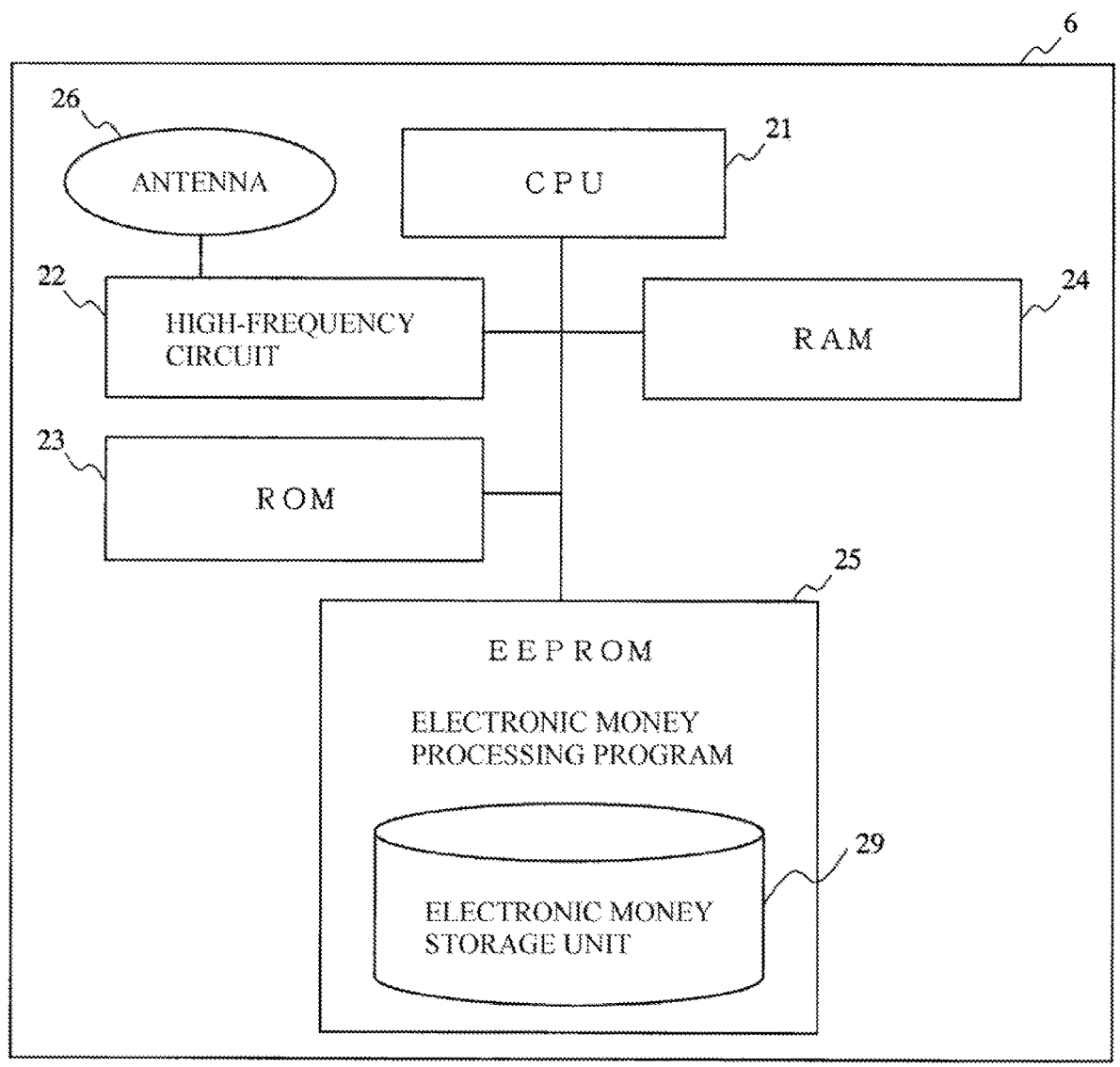
FIG. 2 is a view for explaining a hardware configuration of the electronic money card.

FIG. 2 is a block diagram showing an example of a hardware configuration of the electronic money card 6.

The electronic money card 6 has a CPU (Central Processing Unit) 21, a high-frequency circuit 22, an antenna 26, an ROM (Read Only Memory) 23, an RAM (Random Access Memory) 24, an EEPROM (Electrically Erasable and Programmable ROM) 25, and others.

These elements are formed on the IC chip. However, the antenna 26 is formed of an aerial wire weaved near an outer edge portion in the electronic money card 6 or on an elliptic curve using a diagonal line of the electronic money card 6 as an axis, and has an end portion connected with the IC chip.

The CPU 21 is a central processing unit that performs information processing in accordance with various programs stored in the ROM 23 or the EEPROM 25.

Further, the CPU 21 can perform near-field wireless communication with the electronic money terminal 8 through the antenna 26 and the high-frequency circuit 22.

The antenna 26 is an antenna that is used to perform transmission/reception using electric waves with respect to a built-in antenna in the reader/writer unit of the electronic money terminal 8 or the like.

Furthermore, the antenna 26 generates electric power that drives the IC chip by using electric waves from the reader/writer unit.

The high-frequency circuit 22 converts a high frequency transmitted to the antenna 26 from the reader/writer unit into a digital signal to be output to the CPU 21 or converts a digital signal output from the CPU 21 into a high frequency to be transmitted to the reader/writer unit from the antenna 26.

The RAM 24 is a memory which provides a working memory when the CPU 21 executes information processing and into/from which information can be written/read as required.

The RAM 24 can hold stored contents while electric power is supplied to the electronic money card 6, but the stored contents are lost when supply of the electric power is stopped. The RAM 24 provides a memory that is used when the CPU 21 executes, e.g., money amount change processing.

The ROM 23 is a read-only memory that stores a basic program, parameters, data and others that enable the electronic money card 6 to function.

The EEPROM 25 is an ROM into/from which information can be written/erased. Information stored in the EEPROM 25 is held even though electric power is not supplied to the electronic money card 6.

The EEPROM 25 stores an electronic money program that enables the electronic money card 6 to exercise a function as the electronic money card, and has an electronic money storage unit 29 storing various kinds of data such as a value balance or an electronic money function unit ID (which will be explained later) formed therein.

Figure 3:
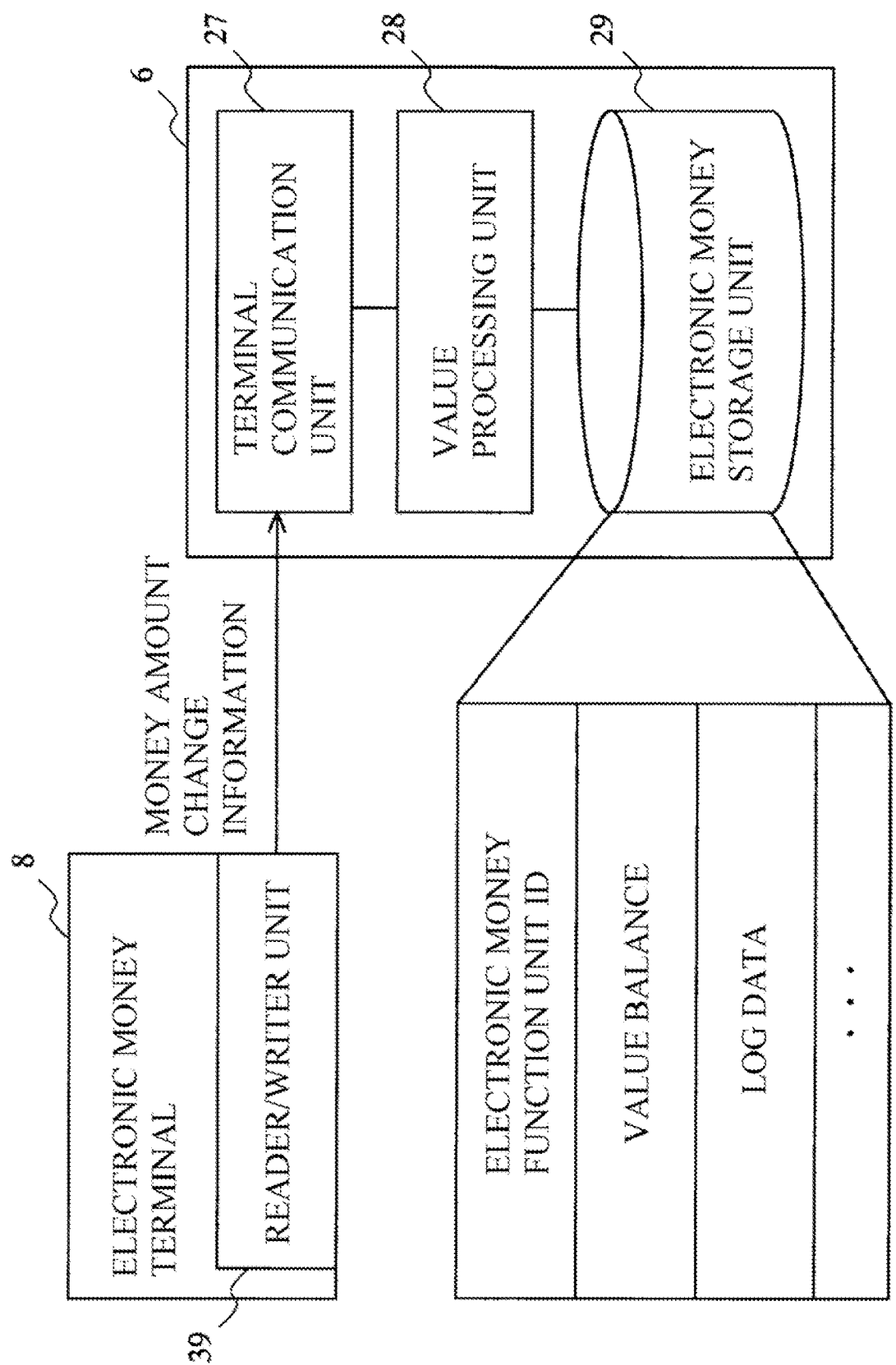
FIG. 3 is a view for explaining a functional configuration of the electronic money card.

FIG. 3 is a block diagram schematically showing a functional structure of the electronic money card 6 that is formed when the CPU 21 executes the electronic money program.

The electronic money storage unit 29 formed in the EEPROM 25 stores an electronic money function unit ID, a value balance, log data, and others.

The electronic money function unit ID is ID information that is uniquely given to an electronic money function of the IC chip, and the electronic money server 2 can use the electronic money function unit ID to specify the IC chip (i.e., the electronic money card 6 or the mobile phone 7 having this IC chip assembled therein).

The value balance is a currently stored balance of a value, and it can be considered that a settlement capability corresponding to this balance amount is provided.

The log data is log data recording processing contents obtained by communication with the electronic money terminal 8 or the electronic money server 2, and it includes, e.g., a date, hours, minutes, and seconds of processing, a charged amount, a settlement amount, a terminal ID of the electronic money terminal 8 that has performed processing, and others.

The terminal communication unit 27 is constituted of the antenna 26 or the high-frequency circuit 22, and mediates communication between the electronic money terminal 8 and a value processing unit 28 by, e.g., receiving money amount change information or any other commands from the reader/writer unit 39 of the electronic money terminal 8 and inputting them to the value processing unit 28.

The value processing unit 28 is an information processing unit that executes various kinds of commands.

The commands include money amount change information (including an overwrite command, an addition command, a subtraction command, and others which will be explained later), an ID reference command, a balance reference command, and others.

The money amount change information is a command that enables the value processing unit 28 to increase/decrease a balance of a value stored in the electronic money storage unit 29 by a money amount specified by the money amount change information and record a history of this processing in log data, and it can be constituted of an addition command, a subtraction command, an overwrite command, and others described below.

The addition command is a command that enables the value processing unit 28 to increase a money amount stored in the electronic money storage unit 29 by a money amount specified by a parameter attached to the addition command.

On the other hand, the subtraction command is a command that enables the value processing unit 28 to decrease a money amount stored in the electronic money storage unit 29 by a money amount specified by a parameter attached to the subtraction command.

For example, if a value balance stored in the electronic money storage unit 29 is 5000 yen and a settlement amount is 1000 yen, the electronic money terminal 8 generates a subtraction command for subtracting 1000 yen and transmits it to the terminal communication unit 27. Further, the value processing unit 28 executes this subtraction command and updates a balance of the value stored in the electronic money storage unit 29 to 5000 yen−1000 yen=4000 yen.

The value processing unit 28 performs the same processing in case of the addition command.

The overwrite command is a command that enables the value processing unit 28 to overwrite a money amount stored in the electronic money storage unit 29 with a money amount specified by a parameter attached to the overwrite command.

When using the overwrite command as the money amount change information, the electronic money terminal 8 calculates an added/subtracted value balance, and the value processing unit 28 is enabled to overwrite a value balance in the electronic money storage unit 29 with this money amount.

For example, a situation where a value balance stored in the electronic money storage unit 29 is 5000 yen and settlement amount is 1000 will now be considered.

The electronic money terminal 8 reads the current value balance 5000 yen from the electronic money card 6 and calculates a balance 5000 yen-1000 yen=4000 yen after settlement. Furthermore, the electronic money terminal 8 generates the overwrite command required to overwrite the value balance with 4000 yen and transmits it to the terminal communication unit 27. Moreover, the value processing unit 28 executes this overwrite command and updates a value balance stored in the electronic money storage unit 29 with 4000 yen.

The electronic money terminal 8 may be configured to use the above-explained addition/subtraction command or configured to use the overwrite command.

Alternatively, the addition/subtraction command can be combined with the overwrite command.

For example, the addition command can be used for charge whilst the overwrite command can be used for settlement, or the overwrite command can be used for charge whilst the subtraction command can be used for settlement.

In this manner, the value processing unit 28 functions as money amount change information receiving means for receiving money amount change information from the money amount change information transmission apparatus (the electronic money terminal 8 or the electronic money server 2) through, e.g., the terminal communication unit 27, and also functions as money amount changing means for changing a money amount stored in the electronic money storage unit 29 by using the received money amount change information.

The ID reference command is a command that enables the value processing unit 28 to read an electronic money function unit ID, and the value processing unit 28 reads an electronic money function unit ID from the electronic money storage unit 29 and outputs the read ID upon receiving the ID reference command.

The balance reference command is a command that enables the value processing unit 28 to read a value balance, and the value processing unit 28 reads a value balance from the electronic money storage unit 29 and outputs the read balance upon receiving the balance reference command.

Figure 4:
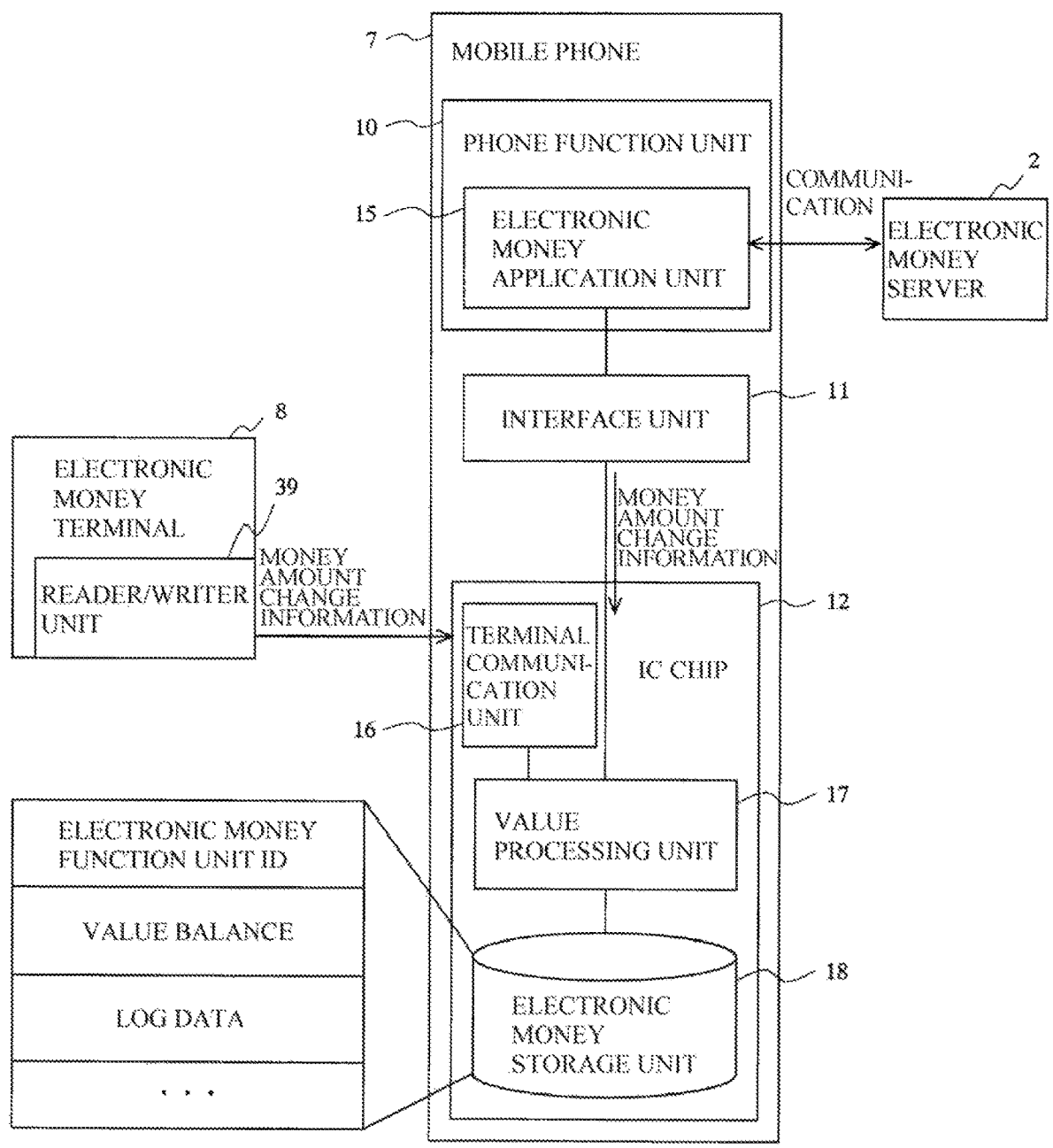
FIG. 4 is a view for explaining a functional configuration of a mobile phone.

FIG. 4 is a conceptual view showing an example of a functional configuration of the mobile phone 7.

The mobile phone 7 includes a phone function unit 10 and an IC chip 12, and they are connected with each other through an interface unit 11.

The IC chip 12 is the same IC chip as the IC chip incorporated in the electronic money card 6 and can realize an electronic money function.

It is to be noted that FIG. 4 shows an example where the IC chip 12 executes the electronic money program and an electronic money function unit is formed in the IC chip 12.

The phone function unit 10 has a talk mode for making a call and an application mode, and the modes can be switched based on an operation of a user.

The phone function unit 10 includes a CPU and a storage unit storing various kinds of application programs, and various application functions can be exercised by executing these application programs by the CPU in the application mode.

An electronic money application unit 15 is formed by executing an electronic money application program by the CPU in the phone function unit 10.

The electronic money application unit 15 can access both the electronic money server 2 and the IC chip 12 and mediate communication between the electronic money server 2 and the IC chip 12.

Therefore, the mobile phone 7 can receive money amount change information or various commands from the electronic money server 2 and input them to the IC chip 12 to enable the IC chip 12 to carry out each function, e.g., charge or settlement.

Additionally, the electronic money application unit 15 can demonstrate various kinds of functions for a user, e.g., displaying a value balance stored in the IC chip 12 in a display of the mobile phone 7 or reading an electronic money function unit ID as ID information inherent to the IC chip 12 from the IC chip 12 to be displayed in the display.

The IC chip 12 is connected with the electronic money application unit 15 through the interface unit 11.

In the IC chip 12, like the electronic money card 6, a terminal communication unit 16, a value processing unit 17, an electronic money storage unit 18, and others are formed when the CPU executes in the IC chip the electronic money program stored in the EEPROM. These functions are the same as those in the electronic money card 6 depicted in FIG. 3.

The value processing unit 17 can communicate with the electronic money terminal 8 through the terminal communication unit 16 to execute the same information processing (e.g., charge or settlement) as that of the electronic money card 6 and can also communicate with the electronic money server 2 through the electronic money application unit 15 to execute the same information processing.

The electronic money storage unit 18 stores an electronic money function unit ID, a value balance, log data, and others.

Figure 5:
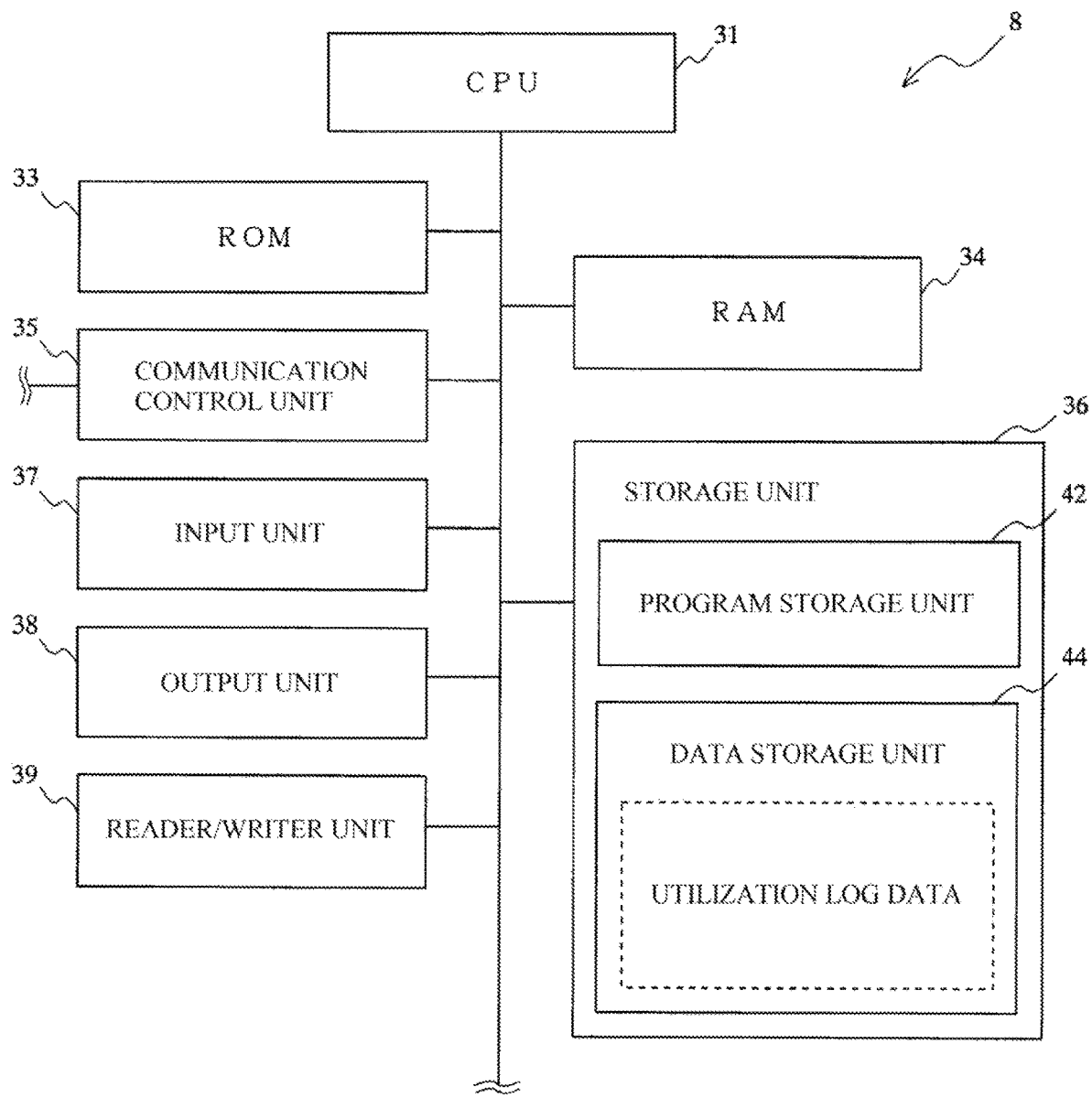
FIG. 5 is a view for explaining a hardware configuration of an electronic money terminal.

FIG. 5 is a view showing an example of a hardware configuration of the electronic money terminal 8.

The electronic money terminal 8 is configured by connecting a CPU 31, an ROM 33, an RAM, a communication control unit 35, a storage unit 36, an input unit 37, an output unit 38, a reader/write unit 39, and others through a bus line.

The CPU 31 executes information processing in accordance with a predetermined program and also performs control over the entire electronic money terminal 8.

In this embodiment, the CPU 31 transmits money amount change information to the electronic money card 6 to perform charge or settlement and thereby generate utilization log data, and also performs a retry or reads a current value balance from the electronic money card 6 to confirm whether money amount change processing has been carried out in the electronic money card 6 if no response is transmitted from the electronic money card 6.

The ROM 33 is a read-only memory that stores a basic program or parameters required to operate the electronic money terminal 8.

The RAM 34 is an occasionally writable/readable memory that provides a working memory for the CPU 31 or loads a program or data stored in the storage unit 36 to be saved therein.

The communication control unit 35 is a connection device that connects the electronic money terminal 8 with the electronic money server 2 through the network.

The storage unit 36 includes a program storage unit 42 that is constituted of, e.g., a hard disk or any other storage medium and a driver for driving it and stores various kinds of programs, a data storage unit 44 that stores data, and others.

The program storage unit 42 stores an OS as a basic program that enables the electronic money terminal 8 to function, a program that enables access to the electronic money card 6 to perform charge or settlement or carries out confirmation processing based on a retry or value balance consultation if no response is transmitted, and others.

The data storage unit 44 stores utilization log data as a history of transactions with the electronic money card 6 and others. This utilization log data is transmitted to the electronic money server 2 by batch processing.

The input unit 37 includes an input device such as a keyboard or a barcode reader, and a commodity code, a settlement amount, or a charge amount can be input through this unit.

The output unit 38 is connected with, e.g., a liquid crystal display device or a printer so that information can be presented to a customer or a person in charge in each affiliated store.

The reader/writer unit 39 has a built-in antenna and performs wireless communication with the IC chip of the electronic money card 6.

Figure 6:
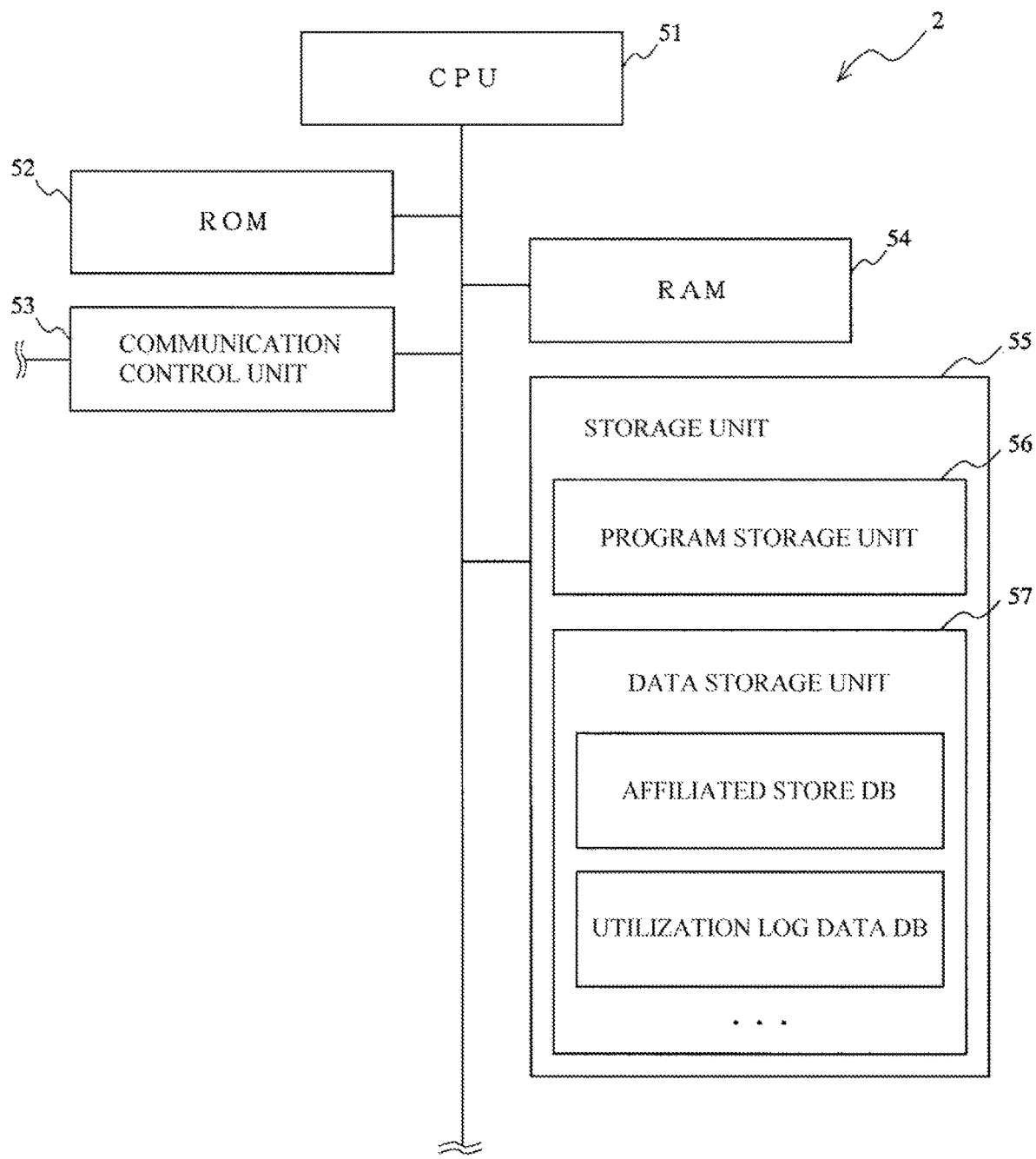
FIG. 6 is a view for explaining a hardware configuration of an electronic money server.

FIG. 6 is a view showing an example of a hardware configuration of the electronic money server 2.

The electronic money server 2 is constituted by connecting a CPU 51, an ROM 52, an RAM 54, a communication control unit 53, a storage unit 55, and others through a bus line.

The CPU 51 is a central processing unit that executes various kinds of information processing in accordance with a predetermined program. In this embodiment, it receives utilization log data from the electronic money terminal 8 to perform tallying processing.

The ROM 52 is a read-only memory, and stores a basic program or parameters required to operate the electronic money server 2.

The RAM 54 is a readable/writable memory, and provides a working memory for the CPU 51 or loads a program or data stored in the storage unit 55 to be saved therein.

The communication control unit 53 is a control unit that communicates with the electronic money terminal 8.

The storage unit 55 is constituted of a high-capacity storage device such as a hard disk, and includes a program storage unit 56 that stores various kinds of programs, a data storage unit 57 that stores data, and others.

The program storage unit 56 stores an OS as a basic program that enables the electronic money server 2 to function, a program that analyzes utilization log data or confirmation log data to be tallied, and any other programs.

The data storage unit 57 stores an affiliated store database storing information of affiliated stores, a transaction database storing utilization log data with respect to the electronic money card 6, and others.

FIG. 7 is a view showing an example of a logical configuration of utilization log data.

The utilization log data includes "electronic money function unit ID", "transaction amount", "date, hours, minutes, and seconds of transaction", "affiliated store ID", "transaction validity flag", and any other items.

In the "electronic money function unit ID", an electronic money function unit ID of the electronic money card 6 with which the electronic money terminal 8 has executed processing is recorded.

In the "transaction amount", discrimination of settlement/charge and an amount of settlement or charge is recorded.

In the "date, hours, minutes, and seconds of transaction", a date, hours, minutes, and seconds that the electronic money terminal 8 has executed processing with the electronic money card 6 is recorded.

In the "affiliated store ID", an affiliated store ID as ID information of each affiliated store having the electronic money terminal 8 installed therein is recorded.

In the "transaction validity flag", whether money amount change processing has succeeded in the electronic money card 6 is recorded as flag information. "Valid" is recorded as a flag when processing using the money amount change information has been carried out in the electronic money card 6, and "invalid" is recorded when processing using the money amount change information has not been carried out.

It is to be noted that, if a particular abnormal situation occurs when a user walks away with the electronic money card 6 from the reader/writer unit 39 at the time of reading a value balance after an unsuccessful retry or when the electronic money card 6 has a failure due to, e.g., lightening strike, the value balance cannot be confirmed in some cases.

In such an exceptional case, "exception" is recorded as the transaction valid flag, and the electronic money center individually deals with each case.

In the utilization log data, for example, "terminal ID" as ID information of the electronic money terminal 8 that has executed processing, an IC chip ID as ID information inherent to each IC chip, "terminal transaction serial number" as a transaction serial number of the electronic money terminal 8, and others can be also recorded as any other items.

Figure 8:
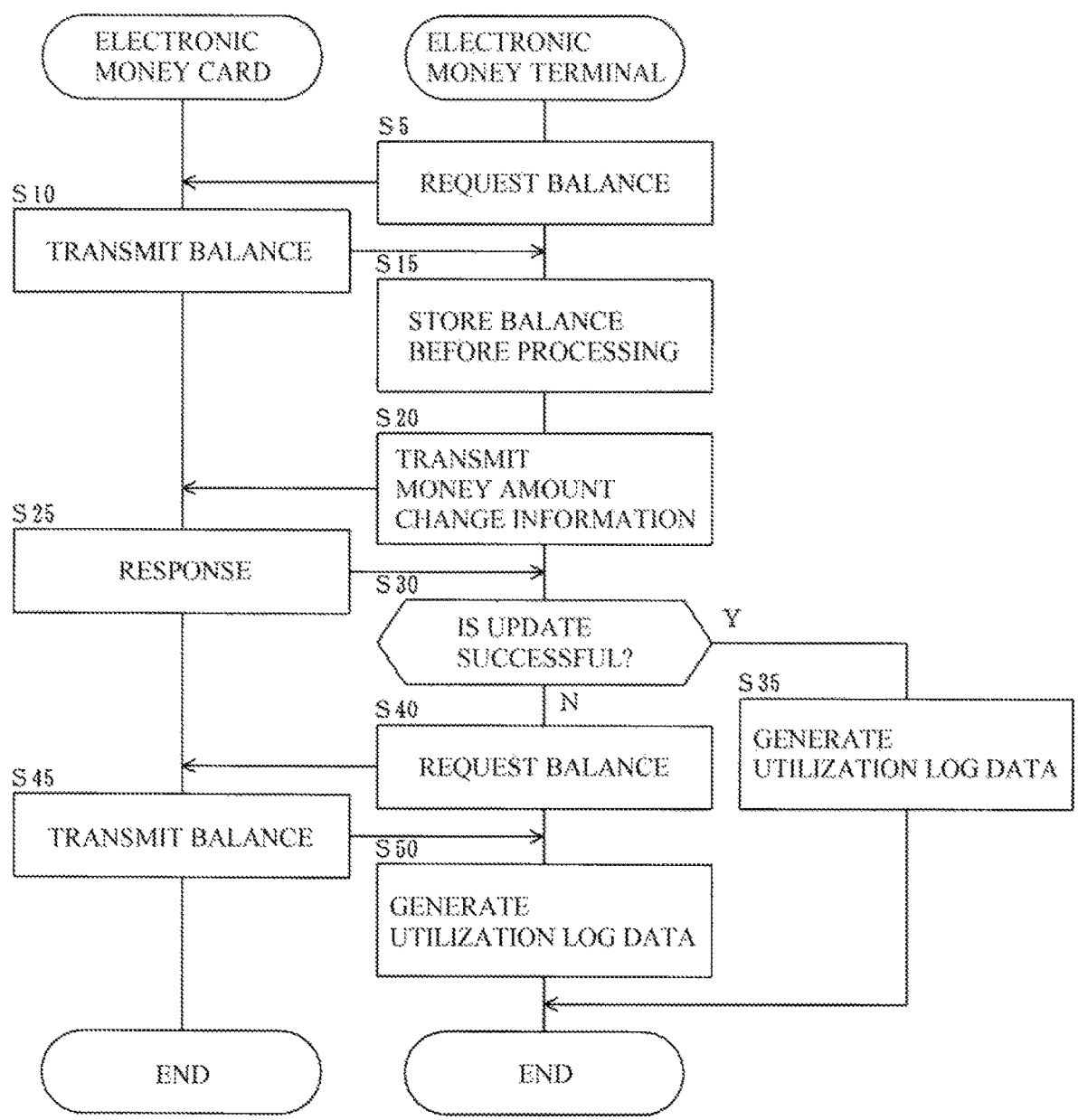
FIG. 8 is a flowchart for explaining settlement processing executed by the electronic money terminal and the electronic money card.

Settlement processing executed by the electronic money card 6 and the electronic money terminal 8 will now be described with reference to a flowchart of FIG. 8.

It is to be noted that the following processing is performed by the CPU 21 in the electronic money card 6 and the CPU 31 in the electronic money terminal 8 in cooperation with each other.

Further, charge processing can be also performed based on the same procedure.

A customer first places the electronic money card 6 on the reader/writer unit 39, and a person in charge in an affiliated store inputs a settlement amount in the electronic money terminal 8.

When the electronic money card 6 is placed on the reader/writer unit 39, the electronic money terminal 8 detects this state, starts communication with the electronic money card 6 and, although not shown in the flowchart, transmits an ID reference command to the electronic money card 6 to request the electronic money card 6 to transmit an electronic money function unit ID.

The electronic money card 6 receives the ID reference command to execute this command, and reads the electronic money function unit ID from the electronic money storage unit 29 to be transmitted to the electronic money terminal 8.

Furthermore, the electronic money terminal 8 receives the electronic money function unit ID from the electronic money card 6 and stores it in, e.g., the RAM 34 (FIG. 5).

Then, the electronic money terminal 8 transmits a balance reference command to the electronic money card 6 and requests the electronic money card 6 to make reference to a current value balance (i.e., a value balance before the money amount change processing) of the electronic money card 6 (a step S).

The electronic money card 6 receives the balance reference command to execute this command, reads the current value balance from the electronic money storage unit 29, and transmits it to the electronic money terminal 8 (a step 10).

The electronic money terminal 8 receives the value balance from the electronic money card 6 and stores it in, e.g., the RAM 34 (a step 15).

As explained above, the electronic money terminal 8 includes first balance acquiring means for acquiring a balance before transmission of money amount change information from a currency terminal.

Subsequently, the electronic money terminal 8 generates the money amount change information required to decrease a value corresponding to a settlement amount and transmits it to the electronic money card 6 (a step 20).

As explained above, the electronic money terminal 8 includes money amount change information generating means for acquiring a money amount concerning a change to generate the money amount change information and money amount change information transmitting means for transmitting this money amount change information to the currency terminal.

The electronic money card 6 receives the money amount change information from the electronic money terminal 8 and decreases a value balance stored in the electronic money storage unit 29 for a settlement amount by using the received information, thereby updating the value balance.

When update of the value balance is successful, the electronic money card 6 transmits predetermined notification to the electronic money terminal 8 to make a response indicating that the money amount change processing has been completed to the electronic money terminal 8 and, if the money amount change processing has been completed, the electronic money card 6 transmits predetermined notification to the electronic money terminal 8 to make a response (a step 25).

After transmission of the money amount change information to the electronic money card 6, the electronic money terminal 8 waits for a response from the electronic money cared 6 for a predetermined time.

When a response is transmitted from the electronic money card 6 within a predetermined time (i.e., when predetermined notification is received from the electronic money card 6), the electronic money terminal 8 determines that the money amount change processing has succeeded in the electronic money card 6 (a step 30; Y). Furthermore, the electronic money terminal 8 sets the transaction validity flag to "valid" to generate utilization log data (a step 35), and stores this data in the data storage unit 44.

As explained above, the electronic money terminal 8 includes notification receiving means for receiving notification indicating that a money amount has been changed based on the money amount change information from the currency terminal.

When no response is transmitted from the electronic money card 6 within the predetermined time, the electronic money terminal 8 again transmits the money amount change information to the electronic money card 6 to carry out a retry.

When no response is transmitted from the electronic money card 6 even though the retry is made, the electronic money terminal 8 recognizes a state where whether the money amount change processing has been effected in the electronic money card 6 is unclear (the step 30; N).

It is to be noted that the retry can be performed for a plurality of number of times or the retry can be prevented from being carried out.

As explained above, when the electronic money terminal 8 recognizes that whether the money amount change processing has been performed in the electronic money card 6 is unclear, it transmits the balance reference command to the electronic money card 6 and thereby requests the electronic money card 6 to notify a current value balance (a step 40).

At this time, the electronic money terminal 8 can inform, e.g., the person in charge that a value balance is to be confirmed in the form of display or sound.

As explained above, the electronic money terminal 8 includes second balance acquiring means for acquiring a current balance from the currency terminal when no response is transmitted from the electronic money card 6 (when predetermined notification is not received).

The electronic money card 6 receives the balance reference command from the electronic money terminal 8, executes this command, reads a value balance from the electronic money storage unit 29, and transmits the value balance to the electronic money terminal 8 (a step 45).

The electronic money terminal 8 receives the current value balance from the electronic money card 6, and compares this value balance with the value balance before processing stored at the step 15.

As a result of comparison, when the current value balance is smaller than the value balance stored at the step 15, the electronic money terminal 8 determines that the money amount change processing as a reduction in money amount has succeeded in the electronic money card 6.

On the other hand, when the current value balance is equal to the value balance stored at the step 15, the electronic money terminal 8 determines that the money amount change processing has not succeeded in the electronic money card 6.

In this manner, the electronic money terminal 8 includes comparing means for comparing a balance acquired by the first balance acquiring means (a value balance before transmission of the money amount change information) with a balance acquired by the second balance acquiring means (a current value balance) and judging means for judging whether a money amount has been changed based on the money amount change information in the currency terminal from a comparison result obtained from the comparing means.

Then, the electronic money terminal 8 performs value balance conforming processing and then generates utilization log data to be stored in the data storage unit 44 (a step 50).

The electronic money terminal 8 sets the transaction validity flag of the utilization log data to "valid" when the money amount change processing has succeeded and sets the same to "invalid" when the money amount change processing has not succeeded.

Moreover, for example, when a user walks away with the electronic money card 6 so that a value balance cannot be confirmed, the transaction validity flag is set to "exception".

As explained above, the electronic money terminal 8 can confirm whether the money amount change processing has been carried out in the electronic money card 6 by comparing a value balance before transmission of the money amount change information with a value balance after transmission of the money amount change information.

It is to be noted that the utilization log data having the transaction validity flag set to "invalid" is generated to terminate the processing if the money amount change processing is unsuccessful in the above example, but a retry can be further performed if an unsuccessful result of the money amount change processing is confirmed.

As explained above, in the electronic money terminal 8, the money amount change information transmitting means can be configured to again transmit the money amount change information to the currency terminal (i.e., make a retry) when the judging means determines that a money amount has not been changed.

Additionally, not only a magnitude relation between a current value balance and a stored value balance but also a difference in money amount can be confirmed.

In this case, the electronic money terminal 8 confirms whether the current value balance is equal to an amount obtained by subtracting a settlement amount from the value balance stored at the step 15, recognizes that the money amount change processing has succeeded if they are equal to each other, and recognizes that the processing has not succeeded if they are not equal to each other.

Although the above example corresponds to settlement, the electronic money terminal 8 and the electronic money card 6 perform the same processing in case of charge.

In case of charge, at the time of comparing a value balance before processing stored at the step 15 with a current value balance, the electronic money terminal 8 determines that the money amount change processing based on an increase in amount has been performed in the electronic money card 6 when the current value balance is higher than the value balance stored at the step 15, or determines that the money amount change processing using the money amount change information has not succeeded when these value balances are not equal to each other.

Figure 9:
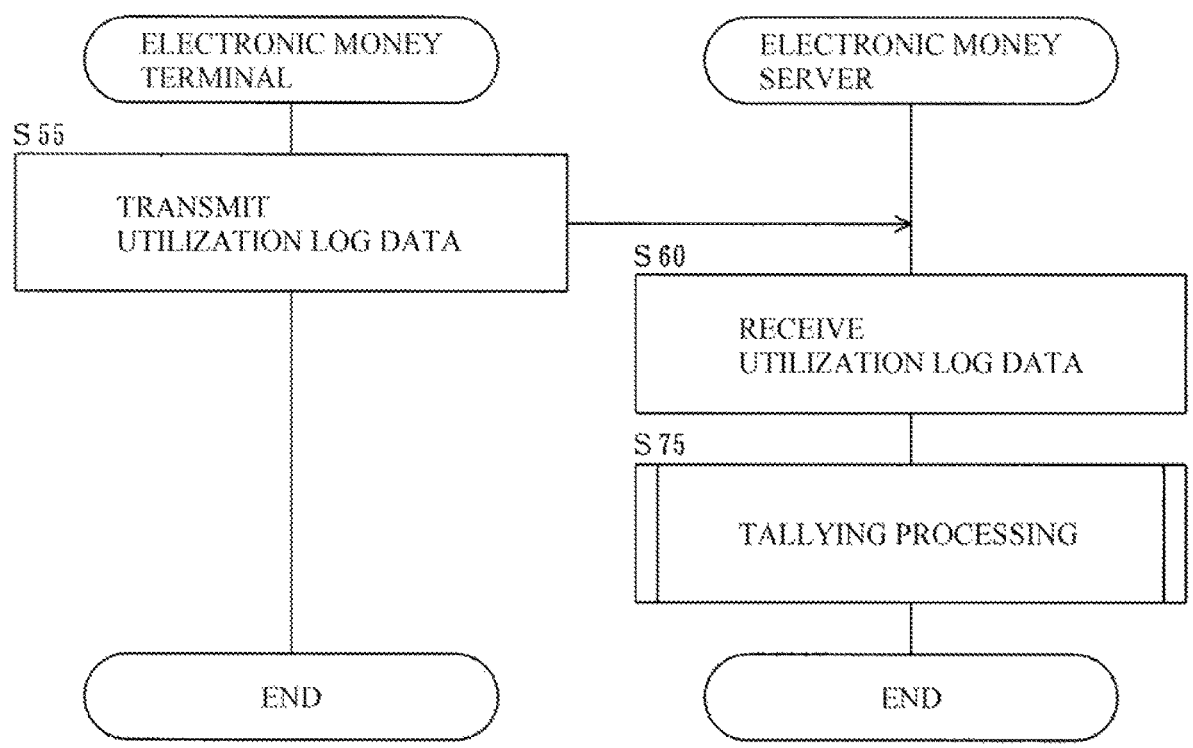
FIG. 9 is a flowchart for explaining a procedure of transmitting utilization log data to the electronic money server by the electronic money terminal.

FIG. 9 is a flowchart for explaining a procedure of transmitting utilization log data from the electronic money terminal 8 to the electronic money server 2.

When a predetermined clock time is reached, the electronic money terminal 8 connects a communication line with the electronic money server 2 approximately once a day. Further, it transmits utilization log data stored in the data storage unit 44 from previous transmission to a current moment to the electronic money server 2 (a step 55).

The electronic money server 2 receives the utilization log data from the electronic money terminal 8 and stores it in the data storage unit 57 (a step 60).

The electronic money server 2 stores the utilization log data in the data storage unit 57 for a predetermined period (e.g., one month) as explained above, and then executes tallying processing with respect to a total amount of charge amounts and a total amount of settlement amounts in each affiliated store (a step 75).

Figure 10:
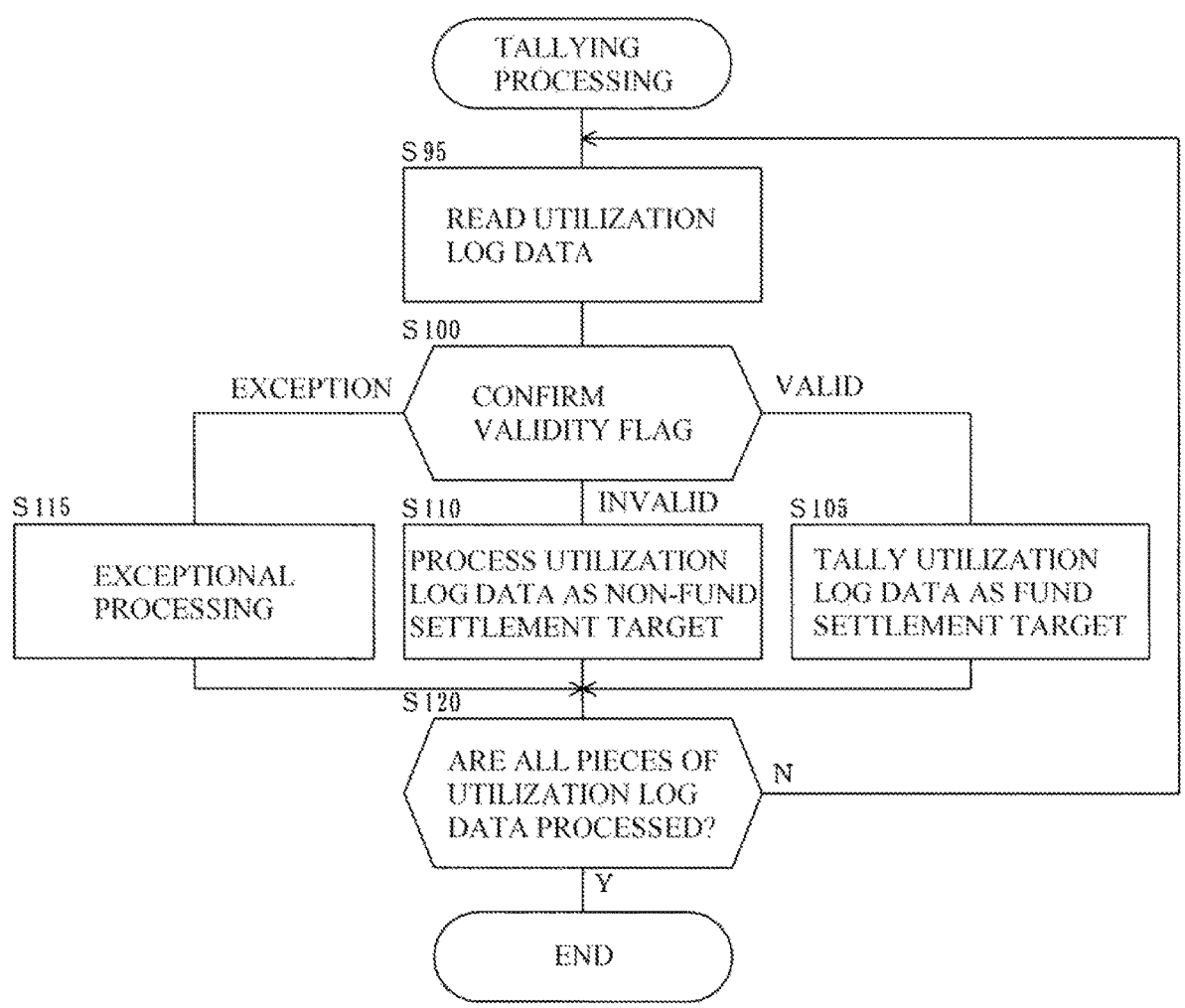
FIG. 10 is a flowchart for explaining a procedure of executing tallying processing by the electronic money server.

FIG. 10 is a flowchart for explaining a procedure of performing the tallying processing by the electronic money server 2 at the step 75 in FIG. 9.

The electronic money server 2 executes the following processing in accordance with each affiliated store.

First, the electronic money server 2 uses an affiliated store ID of each affiliated store as a tally target to read utilization log data of this affiliated store from the data storage unit 57 (a step 95).

Moreover, the electronic money server 2 confirms the transaction validity flag of the read utilization log data (a step 100).

When the transaction validity flag is "valid" (the step 100; valid), the electronic money server 2 tallies the utilization log data as a fund settlement target (a step 105).

Additionally, when the transaction validity flag is "invalid" (the step 100; invalid), the electronic money server 2 processes the utilization log data as a non-target for fund settlement (a step 110).

Further, when the transaction validity flag is "exception" (the step 100; exception), the electronic money server 2 executes exceptional processing, e.g., classifying the utilization log data into an exception directory (a step 115).

For example, a person in charge in the electronic money center individually deals with the utilization log data classified in this directory As explained above, the electronic money server 2 processes this utilization log data, and then confirms whether the processing has been executed with respect to all pieces of utilization log data of the affiliated store (a step 120).

If unprocessed utilization log data remains (the step 120; N), the electronic money server 2 returns to the step 95 to process the utilization log data. On the other hand, if all the pieces of utilization log data have been processed (the step 120; Y), the electronic money server 2 terminates the tallying processing of the affiliated store.

As explained above, this embodiment can obtain the following effects.

(1) Even if a response indicative of execution of money amount change information is not transmitted from the electronic money card 6 or the mobile phone 7, the electronic money terminal 8 can compare value balances of the electronic money card 6 or the mobile phone 7 before and after transmission of the money amount change information to confirm whether the electronic money card 6 or the mobile phone 7 has carried out the money amount change information.

(2) Even if a response is not transmitted from the electronic money card 6 or the mobile phone 7 after the money amount change processing and utilization log data cannot be generated, the electronic money terminal 8 can confirm whether the money amount change information has been carried out and record a confirmation result in the utilization log data.

(3) Even if no response is transmitted, the electronic money server 2 can confirm the transaction validity flag of the utilization log data to determine executed money amount change information as a fund settlement target.

(Modification)

A modification of this embodiment will now be described.

Figure 11:
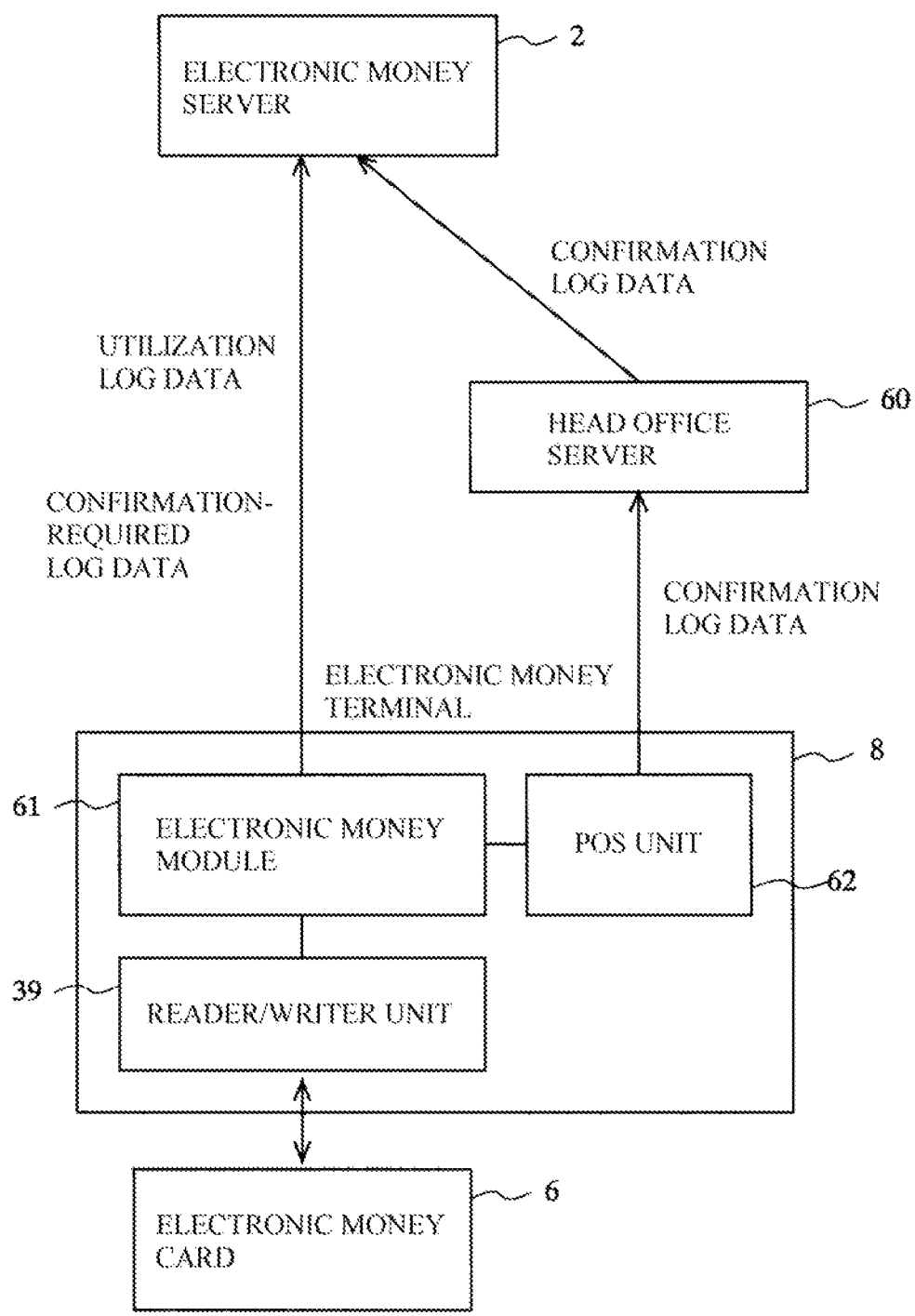
FIG. 11 is a view for explaining a network configuration of an electronic money system according to a modification.

FIG. 11 is a view for explaining a configuration of an electronic money system 1 according to this modification.

The electronic money system 1 according to this embodiment includes a head office server 60 operated by a head office of each affiliated store. The head office server 60 and a POS unit 62 incorporated in an electronic money terminal 8 constitute a POS system (Point of Sales System) to collect information, e.g., sales from each affiliated store.

The electronic money terminal 8 includes the POS unit 62, an electronic money module 61, a reader/writer unit 39, and others.

The POS unit 62 issues various kinds of instructions, e.g., a money amount change instruction, an ID reference instruction, a balance reference instruction, and others to the electronic money module 61, and the electronic money module 61 generates money amount change information, an ID reference command, a balance reference command, and others in response to these instructions and transmits them to an electronic money card 6 through the reader/writer unit 39.

Furthermore, the electronic money module 61 transmits a response indicating whether money amount change processing has succeeded, an electronic money function unit ID, a value balance, and others sent from the electronic money card 6 in response to such commands to the POS unit 62.

That is, the electronic money module 61 functions as a mediating unit for processing executed by the POS unit 62 with respect to the electronic money card 6.

When the POS unit 62 that issues instructions and the electronic money module 61 that generates commands are separated from each other in this manner, information concerning security, e.g., a private key can be sealed in the electronic money module 61, thereby increasing security of the system.

The electronic money module 61 generates utilization log data or later-explained confirmation-required log data in relation to the processing with respect to the electronic money card 6, stores the generated data, and transmits it to the electronic money server 2 every predetermined period.

The item "transaction validity flag" is eliminated from FIG. 7 in the utilization log data generated in this modification, and this utilization log data includes the "electronic money function unit ID", the "transaction amount", the "date, hours, minutes, and seconds of transaction", the "affiliated store ID", and other items.

Further, when there is no response after transmission of the money amount change information to the electronic money card 6 and a retry is unsuccessful, the electronic money module 61 generates confirmation-required log data and transmits it to the electronic money server 2.

As contents of the confirmation-required log data, a confirmation-required flag indicating that confirmation is required is set in addition to the same contents as those of the utilization log data according to this modification.

In this manner, the electronic money terminal 8 includes first log data transmitting means for generating log data (the utilization log data and the confirmation-required log data) recording a money amount concerning the money amount change information and whether notification indicating that the money amount has been changed is received from the electronic money card 6 in the electronic money module 61 and transmitting the generated data to a predetermined server (the electronic money server 2 in this example).

On the other hand, even when there is no response after transmission of the money amount change information to the electronic money card 6 from the electronic money module 61 and a retry is unsuccessful, the POS unit 62 compares value balances before and after transmission of the money amount change information to generate and record confirmation log data like the foregoing embodiment.

Contents of the confirmation log data are the same as those of the utilization log data depicted in FIG. 7, and the confirmation log data includes the respective items "electronic money function unit ID", "transaction amount", "date, hours, minutes, seconds of transaction", "affiliated store ID", "transaction validity flag", and others.

Since the communication line is connected with the head office server 60, the POS unit 62 transmits the confirmation log data to the head office server 60 every predetermined period.

In this manner, the electronic money terminal 8 includes second log data transmitting means for generating the confirmation log data in association with the confirmation-required log data in the POS unit 62 and transmitting the generated log data to a predetermine server (the head office server 60 in this example).

Furthermore, the POS unit 62 can be configured to directly transmit the confirmation log data to the electronic money server 2 as the predetermined server.

As explained above, the predetermined server as a transmission destination of the log data (the utilization log data and the confirmation-required log data) and the predetermined server as a transmission destination of the confirmation log data may be configured as different servers or configured as the same server.

The electronic money module 61 generates the confirmation-required log data and the POS unit 62 generates the confirmation log data in this manner, but the electronic money module 61 does not generate the confirmation log data as mentioned above because the electronic money module 61 is the mediating unit of the POS unit 62 and the electronic money card 6 and the POS unit 62 judges whether transaction has succeeded.

The head office server 60 organizes the confirmation log data transmitted from the POS unit 62 in each affiliated store into one piece of data and transmits this data to the electronic money server 2 every predetermined period.

When the pieces of confirmation log data are aggregated as one piece of data in this manner, a load on the electronic money server 2 can be reduced.

As explained above, the head office server 60 functions as an aggregation server that aggregates the plurality of pieces of conformation log data as one piece of log data.

Operations of the POS unit 62 and the electronic money module 61 will now be described in more detail.

First, the POS unit 62 accepts input of a charge amount or a settlement amount from a person in charge.

Then, the POS unit 62 allows the electronic money module 61 to read a current value balance in the electronic money card 6.

Additionally, the POS unit 62 stores this current value balance, i.e., a value balance before transmission of money amount change information.

Then, the POS unit 62 instructs the electronic money module 61 to transmit the money amount change information.

When a response is transmitted from the electronic money card 6 within a predetermined time, the POS unit 62 terminates the processing, and the electronic money module 61 generates utilization log data.

When no response is transmitted from the electronic money card 6 within the predetermined time, the POS unit 62 allows the electronic money module 61 to make a retry, and the POS unit 62 terminates the processing whilst the electronic money module 61 generates the utilization log data if the retry is successful.

If the retry is unsuccessful, the POS unit 62 instructs the electronic money module 61 to refer the value balance in the electronic money card 6.

The electronic money module 61 reads the value balance in the electronic money card 6 in response to this instruction, transmits the read value balance to the POS unit 62, and generates confirmation-required log data.

On the other hand, the POS unit 62 receives the current value balance from the electronic money module 61, and compares a value balance before transmission of the money amount change information with the current value balance. Moreover, whether the money amount change information has been carried out in the electronic money card 6 is confirmed, and conformation log data having this result recorded therein is generated like the foregoing embodiment.

The transaction validity flag of the confirmation log data is set to "valid" when execution of the money amount change information can be confirmed, it is set to "invalid" when no execution can be confirmed, and it is set to "exception" when the value balance cannot be confirmed.

The utilization log data and the confirmation-required log data generated as explained above are transmitted to the electronic money server 2 from the electronic money module 61, and the confirmation log data is transmitted to the electronic money server 2 via the head office server 60.

It is to be noted that the POS unit 62 can be configured to directly transmit the confirmation log data to the electronic money server 2.

Figure 12:
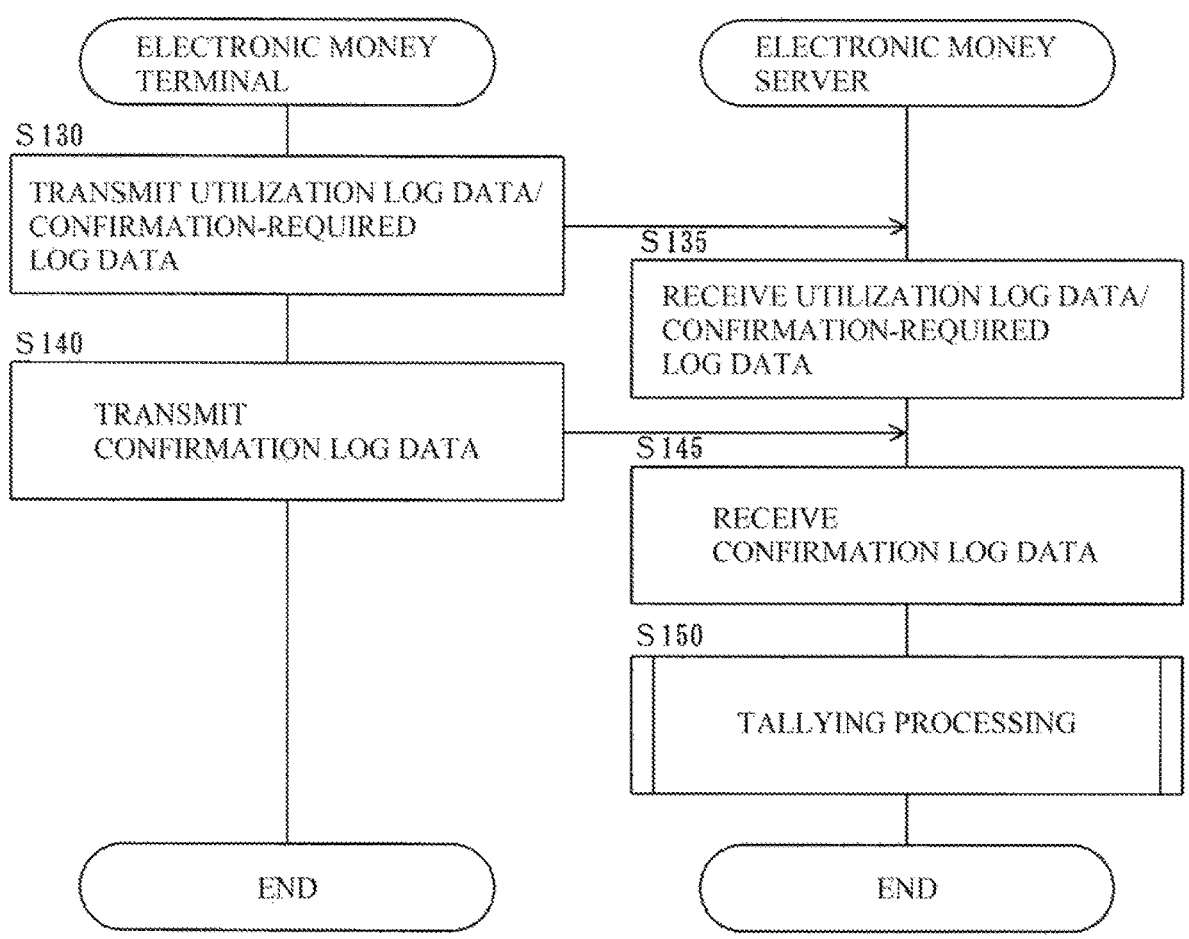
FIG. 12 is a flowchart for explaining a procedure of transmitting various kinds of log data to an electronic money server by an electronic money terminal in the modification.

FIG. 12 is a flowchart for explaining a procedure of transmitting various kinds of log data to the electronic money server 2 by the electronic money terminal 8.

First, the electronic money terminal 8 (the electronic money module 61) is connected with the electronic money server 2 to transmit the utilization log data and the confirmation-required log data to the electronic money server 2 (a step 130).

The electronic money server 2 receives the utilization log data and the confirmation-required log data from the electronic money terminal 8 and stores them in the data storage unit 57 (a step 135). In this manner, the electronic money server 2 includes first log data receiving means.

Then, the electronic money terminal 8 (the POS unit 62) transmits the confirmation log data to the head office server 60, and the head office server 60 transmits this data to the electronic money server 2 (a step 140).

The electronic money server 2 receives the confirmation log data from the electronic money terminal 8 via the head office server 60 and stores this data in the data storage unit 57 (a step 145). In this manner, the electronic money server 2 includes second log data receiving means.

Further, the electronic money server 2 uses the utilization log data, the confirmation-required log data, and the confirmation log data stored in the data storage unit 57 to execute tallying processing (a step 150).

It is to be noted that any one of the utilization log data, the confirmation-required log data, and the confirmation log data can be the first data to be transmitted to the electronic money server 2.

Figure 13:
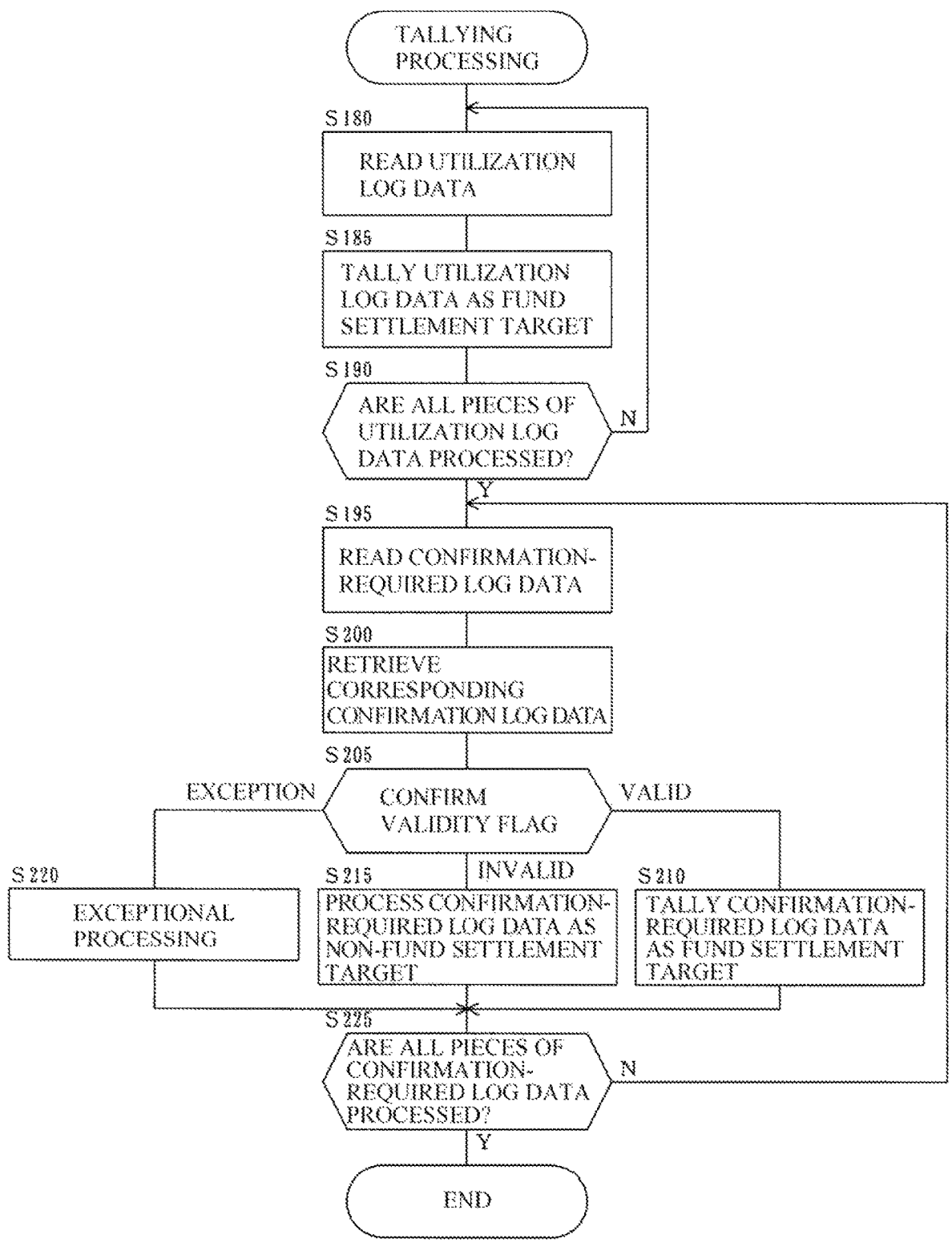
FIG. 13 is a flowchart for explaining a procedure of executing tally processing by the electronic money server in the modification.

FIG. 13 is a flowchart for explaining a procedure of executing the tallying processing by the electronic money server 2.

The electronic money server 2 performs the following processing in accordance with each affiliated store.

First, the electronic money server 2 reads utilization log data of an affiliated store as a processing target from the data storage unit 57 by using an affiliated store ID (a step 180) and tallies it as a fund settlement target (a step 185).

Moreover, the electronic money server 2 confirms whether all pieces of utilization log data of this affiliated store have been processed and, if unprocessed utilization log data still remains (a step 190; N), the electronic money server 2 returns to the step 180 to tally this utilization log data.

When all the pieces of utilization log data have been processed (the step 190; Y), the electronic money server 2 reads confirmation-required log data of the affiliated store (a step 195).

Then, the electronic money server 2 retrieves confirmation log data associated with the read confirmation-required log data in the data storage unit 57 (a step 200).

This retrieval can be performed by using, e.g., an electronic money function unit ID and a date, hours, minutes and seconds of transaction as keys. In this manner, the electronic money server 2 includes retrieving means.

The electronic money server 2 confirms the transaction validity flag of the retrieved confirmation log data, it tallies the confirmation-required log data as a fund settlement target (a step 210) if this flag is set to "valid" (a step 205; valid), and processes the confirmation-required log data as a non-target for fund settlement (a step 215) if this flag is set to "invalid" (a step 205; invalid).

Additionally, if the transaction validity flag is "exception" (the step 205; exception), the electronic money server 2 performs exceptional processing, e.g., classifying the confirmation log data into an exception directory (a step 220), and a person in charge in the electronic money center individually deals with each case.

In this manner, the electronic money server 2 includes confirming means for confirming the confirmation-required log data by using the confirmation log data.

Then, the electronic money server 2 confirms whether all pieces of confirmation-required log data concerning the affiliated store have been processed, and the electronic money server 2 returns to the step 195 to continue the processing if unprocessed confirmation-required log data remains (a step 225; N) or terminates the tallying processing if all the pieces of confirmation-required log data have been processed (the step 225; Y).

As explained above, even if confirmation-required log data is generated in the electronic money module 61, whether transaction using this confirmation-required log data is valid can be judged by providing the POS system with a confirmation log data generating function.

It is to be noted that the POS unit 62 confirms validity of transaction in this embodiment but the electronic money server 2 can be configured to confirm the same.

In this case, the electronic money server 2 requests the POS unit 62 to transmit an electronic money function unit ID, a date, hours, minutes, and seconds of transaction, and value balances before and after transmission of money amount change information, uses the electronic money function unit ID and the date, hours, minutes, and seconds of transaction to perform association with confirmation-required log data, and compares the value balances before and after transmission of the money amount change information, thereby confirming whether the money amount change information has been carried out in the electronic money card 6.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing apparatus, comprising:
a near-field wireless communication unit, which includes a near-field radio frequency antenna and a high frequency circuit configured to convert signals between high-frequency signals transmitted on the near-field radio frequency antenna and digital signals to be input to, or output from, a central processing unit, and is configured to:
at a first time, transmit a first update command for updating a value stored in a terminal device to the terminal device,
wherein the value indicates an amount of electronic money,
wait a first predetermined time after the first time,
at a second time after waiting the first predetermined time after the first time when first update command was transmitted, transmit a second update command when no notification is received after the first update command transmitted within the first predetermined time, and
wait a second predetermined time after the second time, wherein the value stored in the terminal device is a first value before the first update command is transmitted, the value stored in the terminal device is second value after the first update command is transmitted and before the second update command is transmitted, the value stored in the terminal device is a third value after the second update command is transmitted and before the second predetermined time is waited, and the value stored in the terminal device is a fourth value after the second predetermined time is waited, wherein the fourth value is one of a same value as the first, second, and third value, or a different value from at least one of the first, second, and third value; and
a control unit configured to determine if the value has been changed by comparing the first value retrieved from the terminal device before the first update command transmitted and the fourth value retrieved from the terminal device after the second update command transmitted when no notification is received after the second update command transmitted within the second predetermined time,
wherein responsive to determining that the fourth value is the same value as the first value, the control unit generates utilization log data.

2. The information processing apparatus according to claim 1, wherein the communication unit is further configured to transmit a third update command when the control unit determined the value has not been changed.

3. The information processing apparatus according to claim 1, wherein comparison between the first value and the fourth value is performed only when no notification is received.

4. An information processing method, comprising:
at a first time, transmitting, by a near-field wireless communication unit in an information processing apparatus, a first update command for updating a value stored in a terminal device to the terminal device,
wherein the value indicates an amount of electronic money,
wherein the near-field wireless communication unit includes a near-field radio frequency antenna and a high frequency circuit configured to convert signals between high-frequency signals transmitted on the near-field radio frequency antenna and digital signals to be input to, or output from, a central processing unit;
waiting a first predetermined time after the first time;
at a second time after waiting the first predetermined time after the first time when first update command was transmitted, transmitting, by the information processing apparatus, a second update command when no notification is received after the first update command transmitted within the first predetermined time;
waiting a second predetermined time after the second time, wherein the value stored in the terminal device is a first value before the first update command is transmitted, the value stored in the terminal device is second value after the first update command is transmitted and before the second update command is transmitted, the value stored in the terminal device is a third value after the second update command is transmitted and before the second predetermined time is waited, and the value stored in the terminal device is a fourth value after the second predetermined time is waited, wherein the fourth value is one of a same value as the first, second, and third value, or a different value from at least one of the first, second, and third value;
determining if the value has been changed by comparing the first value retrieved from the terminal device before the first update command transmitted and the fourth value retrieved from the terminal device after the second update command transmitted when no notification is received after the second update command transmitted within the second predetermined time; and
responsive to determining that the fourth value is the same value as the first value, the control unit generates utilization log data.

5. The information processing method according to claim 4, wherein the method further comprising transmitting a third update command when the control unit determined the value has not been changed.

6. The information processing method according to claim 4, wherein comparison between the first value and the fourth value is performed only when no notification is received.

* * * * *